(No Model.)

H. L. SNOW.
REPLACING FROG.

No. 560,944. Patented May 26, 1896.

Witnesses:
G. A. Pinnington
A. R. Cornwall

Inventor
Henry L. Snow
by Paul Bakewell
Attorney.

UNITED STATES PATENT OFFICE.

HENRY L. SNOW, OF ST. LOUIS, MISSOURI.

REPLACING-FROG.

SPECIFICATION forming part of Letters Patent No. 560,944, dated May 26, 1896.

Application filed February 13, 1896. Serial No. 579,141. (No model.)

*To all whom it may concern:*

Be it known that I, HENRY L. SNOW, a citizen of the United States, residing at the city of St. Louis, State of Missouri, have invented a certain new and useful Improvement in Replacing-Frogs, of which the following is a full, clear, and exact description, reference being had to the accompanying drawings, forming part of this specification, wherein—

Figure 1:
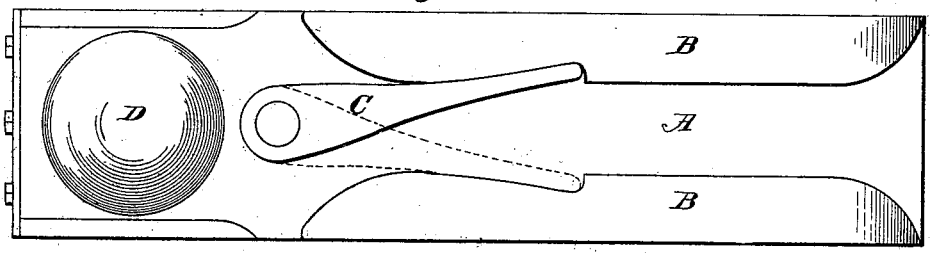
Figure 2:
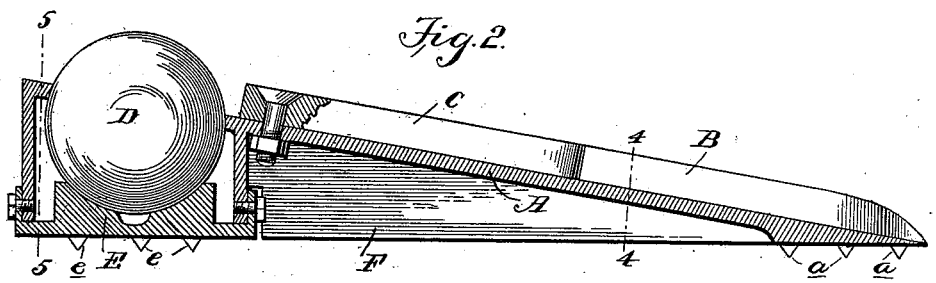
Figure 3:
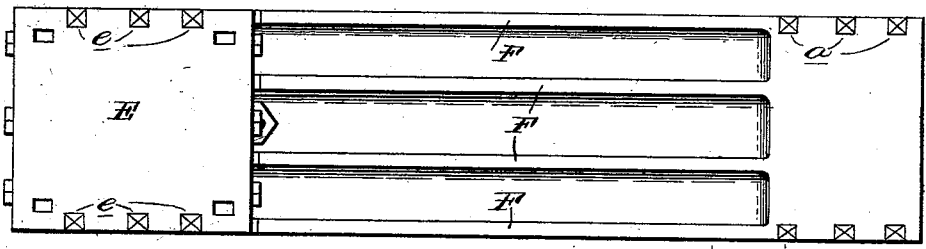
Figure 4:
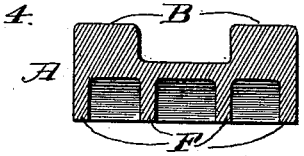
Figure 5:
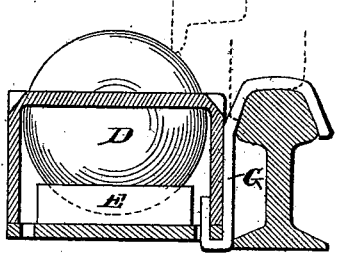

Figure 1 is a top plan view of my improved replacing-frog. Fig. 2 is a longitudinal vertical section through the same. Fig. 3 is a bottom plan view. Fig. 4 is a cross-sectional view on the line 4 4, Fig. 2; and Fig. 5 is a cross-sectional view on the line 5 5, Fig. 2, showing the frog in position against the rail and showing in dotted lines the position of the wheel in sliding down from the head of the frog.

This invention relates to a new and useful improvement in "replacing-frogs," as they are called, which are designed to be used to replace derailed cars upon the rails.

The invention consists in forming the upper face of the body of the replacer with a depressed portion in which the flange of the wheel passes, the tread of the wheel rolling on the raised side rails. A switch is also provided to coöperate with these raised side rails, so as to direct the wheel to one side or the other of the replacer. The head of the replacer is formed with a knob elevated somewhat above the plane of the body of the replacer, said knob being designed to throw the wheel upon the rail.

The invention further consists in the construction, arrangement, and combination of the several parts, all as will hereinafter be described, and afterward pointed out in the claims.

In the drawings, A indicates the body of the replacer, which is substantially wedge shape in appearance. Rising from the sides of this body are side rails B, between which is formed a groove for the flange of the wheel. These side rails are preferably formed with diverging ends, so as to afford a bell-shaped guiding-mouth to the intervening groove. The side rails are also tapered at their lower ends, so that when the wheel first enters the groove it rides upon its flange, forcing the retaining-teeth $a$ on its under side into the tie or ground before the tread of the wheel rides upon the side rail. In this manner the replacer is fixed in position before the weight is thrown to one side, and having a secure bearing is not liable to tilt over, dumping the wheel on the ground again.

C indicates the switch-tongue, pivotally secured to the body A near its head and adapted to coöperate with the side rails B, so as to direct the wheel to one side or the other of the knob at the head.

D indicates the knob-head, which projects up above the plane of the body A, which knob-head is adapted to receive the wheel and cast it over and upon the rail. In the instance of the replacer being used as a male where the wheel is outside of the track the same would be higher than the replacer used for the wheel between the rails, because the male replacer has to cast the flange of the wheel over the rail, whereas the flange of the wheel rides up the knob of the female replacer, whose duty it is to cast the tread of the wheel only upon the rail and not to cast the flange over the rail. A female replacer is shown in operation in Fig. 5, where the flange of the wheel rides up the knob a sufficient distance to cast the tread of the wheel upon the rail.

In order to prevent the wheel as it slides down from the knob from catching upon any shoulders or projections of the body, I prefer to swage said body at its upper side edges as I have shown in Figs. 1 and 5.

The knob D may be cast upon the body A, in which event it would be stationary; but I have shown it in the drawings as being a portion of a sphere arranged within the head of the replacer. This sphere is seated in a pocket E, bolted to the under side of the replacer, the lower face of which pocket is provided with teeth $e$ to hold the replacer in position. It will be noticed that the center of this sphere is somewhat below the plane of the body A, so that it is held in position by the top wall of said body. By this construction when the wheel rides upon the knob said knob can easily turn in its socket, whereby the wheel is cast more readily, and there being no slipping between the wheel and knob the knob will not be worn so much, and each time it is used will present a new wearsurface to the wheel. I prefer to cast the body A hollow underneath and strengthen the same by longitudinally-disposed ribs F.

In the use of car-replacers it frequently happens that the wheels are somewhat removed from the rails, and in order to replace the wheels they have to be run up the replacer, cast, and this operation repeated until the wheels are sufficiently close to the rails that the final casting will throw them upon the rails. By making the replacer of some length I am enabled to conduct the wheels from some considerable distance and cast them upon the rail in a single operation. In order to insure a permanent relative position between the head of my replacer and the rail, I have devised an S-shaped clamp G, which is adapted to engage the head of the rail, extending down beneath the replacer to hold the same up to the rail in its work. It frequently happens that the cross-ties are decayed, and when the replacer is in use the weight of the wheels, &c., is so great that it causes the replacer to sink so low that it is impossible to cast the wheels upon the track. Under such conditions the use of the clamp G is indispensable, as it establishes a fixed relation between the replacer and the rail, holding it to its proper height on the rail-side regardless of the condition of the cross-ties.

I am aware that many minor changes in the construction, arrangement, and combination of the several parts of my device can be made and substituted for those herein shown and described without in the least departing from the nature and principle of my invention.

Having thus described my invention, what I claim, and desire to secure by Letters Patent of the United States, is—

1. In a car-replacer, the combination with a semispherical knob-head for casting the wheels upon the rails, of an approach for the wheels to said knob-head, and a switch-tongue in said approach for directing the wheels to either side of the knob-head; substantially as described.

2. In a car-replacer, the combination with the body, of side rails arranged upon its upper face, said side rails forming an approach, a semispherical knob-head for casting the wheel to be replaced, upon the rail, and a switch-tongue for directing said wheel to either side of said knob-head, said switch-tongue coöperating with said side rails; substantially as described.

3. In a car-replacer, the combination with a semispherical knob-head for casting the wheels upon the rail to either side, and an approach for the wheel to said knob-head; substantially as described.

4. In a car-replacer, the combination with a movable spherical knob-head, and an approach for the wheel to said knob-head; substantially as described.

5. In a car-replacer, the combination with the body, of a sphere arranged therein for casting the wheel upon the rail; substantially as described.

6. In a car-replacer, the combination with the body, of a sphere arranged therein and projecting through an opening in said body of less diameter than the sphere; substantially as described.

7. In a car-replacer, the combination with the body, of a sphere arranged therein and projecting through an opening in the body of less diameter than that of the sphere, and a seat or pocket for said sphere which is adapted to rest upon the ground or cross-ties during the operation of the device; substantially as described.

In testimony whereof I hereunto affix my signature, in presence of two witnesses, this 8th day of February, 1896.

HENRY L. SNOW.

Witnesses:
F. R. CORNWALL,
HUGH K. WAGNER.